United States Patent Office 2,803,622
Patented Aug. 20, 1957

2,803,622

PROCESS FOR COPOLYMERIZING ACENAPHTHYLENE WITH STYRENE

Earl C. Chapin, Springfield, Mass., assignor to Monsanto Chemical Company, St. Louis, Mo., a corporation of Delaware No Drawing. Application August 3, 1953,
Serial No. 372,187

6 Claims. (Cl. 260—80.5)

This invention relates to copolymers of styrene and acenaphthylene. More particularly the invention relates to a process for preparing copolymers of styrene and acenaphthylene.

Polymers of acenaphthylene are generally prepared by polymerization with Friedel-Crafts catalysts. Copolymers of acenaphthylene have been prepared using the same catalyst and also using benzoyl peroxide as a catalyst. The products obtained have been hard thermoplastic resins useful for many purposes including electrical insulation and coatings.

One of the major drawbacks to the extended use of the polymers and copolymers thus produced has been their low strength properties and extreme brittleness.

One object of this invention is to provide copolymers of styrene and methyl styrenes with acenaphthylene having improved strength properties.

A further object is to provide a process for preparing copolymers of styrene and methyl styrenes with acenaphthylene.

These and other objects are attained by copolymerizing styrene, o-methylsytrene, m-methylstyrene, p-methylstyrene or mixtures thereof with acenaphthylene in aqueous emulsion using as a catalyst a combination of a salt of persulfuric acid and an alkanolamine.

The following examples are given in illustration and are not intended as limitations on the scope of this invention. Where parts are mentioned they are parts by weight.

Example I

Prepare three solutions as follows:
(A) dissolve 3.0 parts of sulfated sodium naphthenate and 0.4 part of triethanolamine in 200 parts of water, (B) dissolve 5 parts of acenaphthylene in 95 parts of styrene monomer, (C) dissolve 0.4 part of potassium persulfate in 33 parts of water.

Heat solution A to reflux temperature at atmospheric pressure. Add 3 parts of solution C and then by dropwise addition, deliver solution B to the refluxing reaction medium. The addition of solution B should be regulated to take from 100–150 minutes. During the addition of solution B and at intervals of about 20 minutes, add 3-part portions of solution C. Throughout the reaction, maintain constant agitation at reflux temperature and atmospheric pressure.

Coagulate the emulsion thus formed by the addition of an electrolyte such as sodium chloride and wash the coagulum thoroughly with warm water. Dry the washed coagulum in a stream of hot air. A 90% yield of thermoplastic copolymer is obtained. The copolymer may be worked in conventional manner and can be injection molded into a clear transparent object. Injection molded test bars reveal a heat distortion temperature of about 109° C., a tensile strength of 8200 p. s. i. and a flexural strength of 16,500 p. s. i. for the resin.

When the styrene of Example I is replaced in whole or in part by o-, m-, or p-methylstyrenes or mixtures thereof substantially the same results are obtained except that the heat distortion temperatures of the o-methylstyrene copolymers are even higher. A particularly desirable resin is a terpolymer of 62 parts of p-methylstyrene, 33 parts of o-methylstyrene and 5 parts of acenaphthylene.

When the amount of acenaphthylene of Example I is increased until it constitutes 25% of the total monomer, the polymerization process is substantially the same, the product has a much higher heat distortion temperature but it has an intense yellow color. For electrical insulation purposes where color is immaterial, this copolymer is particularly useful but for some products the color may be objectionable.

Example II

Prepare three solutions as follows:
(A) dissolve 3.0 parts of sulfated sodium naphthenate and 0.4 part of triethanolamine in 200 parts of water, (B) dissolve 5 parts of acenaphthylene in a mixture of 62 parts of p-methylstyrene and 33 parts of o-methylstyrene, (C) dissolve 0.4 part of potassium persulfate in 33 parts of water.

Heat solution A to reflux temperature at atmospheric pressure. Add 3 parts of solution C and then by dropwise addition, deliver solution B to the refluxing reaction medium. The addition of solution B should be regulated to take from 100–150 minutes. During the addition of solution B and at intervals of about 20 minutes, add 3-part portions of solution C. Throughout the reaction, maintain constant agitation at reflux temperature.

After coagulation of the emulsion thus formed followed by washing and drying of the coagulum, a thermoplastic powder is obtained which may be injection molded to yield objects having a heat distortion temperature slightly higher than that of the resin obtained in Example I.

The monomers of this invention are restricted to acenaphthylene on the one hand and styrene, o-, m-, or p-methylstyrenes or mixtures thereof on the other hand. To provide a material moldable at reasonable temperatures and pressures, the styrene should constitute 75–97% of the total monomer polymerized.

The amount of water used is not extremely critical except that enough water must be used to give a workable reaction medium. In general, from 100 to 400 parts of water may be used for each 100 parts of monomer.

Various emulsifying agents may be used including cationic, anionic and nonionic compounds or mixtures thereof. The preferred emulsifying agents are sulfated ammonium or alkali metal naphthenates, ammonium or alkali metal alkyl naphthalene sulfonates, and ammonium or alkali metal alkyl benzene sulfonates in which the alkyl groups contain from 10 to 20 carbon atoms. The amount used may vary from 0.1 to 3 parts per 100 parts of monomer.

The catalyst used should be a combination of an ammonium or alkali metal salt of persulfuric acid and an alkanolamine. The persulfates include ammonium, lithium, sodium, potassium and cesium persulfates. The alkanolamine may be a mono, di- or triethanol, propanol or butanolamine. The weight ratio of persulfate to alkanolamine may vary from 1:1 to 1:2. The amount of catalyst combination may vary between 0.1 and 1.0 part per 100 parts of monomer.

The reaction is preferably maintained throughout at reflux temperature at atmospheric pressure accompanied by constant agitation. Temperatures as much as 30° C. below reflux may be used but lowering of the temperature merely serves to prolong the reaction and ordinarily gives no beneficial result. It is also possible to carry out the reaction at pressures up to 500 atmospheres and temperatures up to 200° C. with a concomitant shortening of the reaction time.

Except for catalyst combination the order of addition of the various ingredients may be widely varied. All of the ingredients except the persulfate may be added initially or all of the emulsifying agent may be mixed with the monomers and the resulting mixture added gradually to the aqueous phase or, as shown in the example, three separate solutions may be made with slow and simultaneous addition of monomer and persulfate.

As far as the catalyst combination is concerned, it is necessary to add all of the alkanolamine to the aqueous phase and then add the persulfate gradually as the reaction proceeds. The rate of addition should be controlled so that the reaction proceeds at a substantially uniform rate.

It is essential to use the alkanolamine since without it, the polymers obtained are low molecular weight weak friable materials. For example if Example I is repeated except that no alkanolamine is used, the product is a gummy mass containing much unreacted monomer. The unreacted monomer may be separated from the product only with considerable difficulty and the refined polymer obtained thereby has substantially no tensile strength.

After polymerization is complete, a fairly stable suspension is obtained. The copolymer may be recovered from the suspension by conventional means such as spray drying, drum drying, oven drying etc. If good electrical insulating material is desired, it is best to coagulate the suspension by conventional means such as freezing, or the addition of an electrolyte followed by thorough washing with warm water to remove emulsifying agent and catalyst residues.

The products of the reaction are thermoplastic resins having a high heat distortion temperature and high flexural strength when compared to styrene homopolymers. The resins range in color from deep yellow at 25 parts of acenaphthylene to a very light yellow at or below 5 parts of acenaphthylene. The resins may be modified with conventional additives such as plasticizers, fillers, dyes, pigments, lubricants, etc. and they may be worked by conventional processes such as roll milling, banburying, compression molding, injection molding, etc.

What is claimed is:

1. A process for polymerizing from 3-25% by weight of acenaphthylene with from 97-75% by weight respectively, of a member of the group consisting of styrene, orthomethyl styrene, metamethyl styrene, paramethyl styrene and mixtures thereof, which consists of emulsifying 100 parts of total monomers in from 100-400 parts by weight of water with the aid of from 0.1-3.0 parts of an emulsifying agent and polymerizing the monomers at a temperature ranging from 30° C. below reflux temperature to 200° C. and at a pressure ranging from 1 atmosphere to 500 atmospheres in the presence of from 0.1-1.0 part of a catalyst mixture consisting of a compound taken from the group consisting of ammonium and alkali metal salts of persulfuric acid and an alkanolamine of the group consisting of monoethanolamine, diethanolamine, triethanolamine, propanolamine, and butanolamine, the weight ratio of the persulfate salt to alkanolamine varying from 1:1 to 1:2, all of said alkanolamine being added to the aqueous emulsion before the polymerization is initiated and the persulfate salt being added to the reaction mixture throughout polymerization.

2. A process as in claim 1 wherein the alkanolamine employed is triethanolamine.

3. A process as in claim 2 wherein the salt of persulfuric acid employed is potassium persulfate.

4. A process as in claim 1 wherein 5 parts of acenaphthylene is copolymerized with 62 parts of paramethyl styrene and 33 parts of orthomethyl styrene.

5. A terpolymer consisting of 3-25 weight percent of acenaphthylene and 97-75% by weight of a mixture of orthomethyl styrene and paramethyl styrene.

6. A terpolymer consisting of 5 weight percent acenaphthylene, 62 weight percent paramethyl styrene and 33 weight percent orthomethylstyrene.

References Cited in the file of this patent

UNITED STATES PATENTS 2,563,524    Flowers et al. _____ Aug. 7, 1951